United States Patent
Chesser et al.

(10) Patent No.: US 11,097,473 B2
(45) Date of Patent: Aug. 24, 2021

(54) POLYMER EXHAUST FOR ELIMINATING EXTRUDER TRANSIENTS

(71) Applicant: UT-BATTELLE, LLC, Oak Ridge, TN (US)

(72) Inventors: Phillip C. Chesser, Knoxville, TN (US); Brian K. Post, Knoxville, TN (US); Matthew R. Sallas, Knoxville, TN (US); Alex C. Roschli, Kingston, TN (US); Randall F. Lind, Loudon, TN (US); Lonnie J. Love, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 182 days.

(21) Appl. No.: 16/059,896

(22) Filed: Aug. 9, 2018

(65) Prior Publication Data

US 2019/0047219 A1 Feb. 14, 2019

Related U.S. Application Data

(60) Provisional application No. 62/543,062, filed on Aug. 9, 2017.

(51) Int. Cl.
| | |
|---|---|
| *B29C 64/209* | (2017.01) |
| *B29C 64/106* | (2017.01) |
| *B29C 64/321* | (2017.01) |
| *B33Y 40/00* | (2020.01) |
| *B33Y 10/00* | (2015.01) |
| *B33Y 30/00* | (2015.01) |
| *B29C 64/357* | (2017.01) |

(52) U.S. Cl.
CPC .......... *B29C 64/209* (2017.08); *B29C 64/106* (2017.08); *B29C 64/321* (2017.08); *B29C 64/357* (2017.08); *B33Y 10/00* (2014.12); *B33Y 30/00* (2014.12); *B33Y 40/00* (2014.12)

(58) Field of Classification Search
CPC ... B29C 64/106; B29C 64/209; B29C 64/321; B29C 64/357; B33Y 10/00; B33Y 30/00; B33Y 40/00
See application file for complete search history.

(56) References Cited

U.S. PATENT DOCUMENTS

| | | | |
|---|---|---|---|
| 5,121,329 A * | 6/1992 | Crump | B33Y 40/00 700/119 |
| 5,303,141 A * | 4/1994 | Batchelder | B29C 64/118 700/29 |
| 5,622,216 A * | 4/1997 | Brown | B22D 11/00 164/71.1 |
| 9,862,140 B2 * | 1/2018 | Lewicki | B29C 64/118 |
| 2002/0113331 A1 * | 8/2002 | Zhang | B29C 41/003 264/40.1 |

(Continued)

*Primary Examiner* — Joseph S Del Sole
*Assistant Examiner* — Manley L Cummins, IV
(74) *Attorney, Agent, or Firm* — Pauley Erickson & Swanson

(57) ABSTRACT

An additive manufacturing method that includes an extruder providing a supply of working material and a nozzle connected with respect to the extruder, the nozzle directing the working material to a deposit surface. A diverter valve is positioned between the extruder and the nozzle to direct the working material to an exhaust port away from the deposit surface under certain conditions.

20 Claims, 3 Drawing Sheets

(56) References Cited

U.S. PATENT DOCUMENTS

| | | | |
|---|---|---|---|
| 2005/0015175 A1* | 1/2005 | Huang | B33Y 70/00 |
| | | | 700/121 |
| 2016/0096320 A1* | 4/2016 | Bourgoyne | B29C 48/0019 |
| | | | 428/304.4 |
| 2017/0072614 A1 | 3/2017 | Lind et al. | |
| 2017/0203391 A1* | 7/2017 | Budge | B23K 10/027 |
| 2017/0291364 A1* | 10/2017 | Womer | B29C 48/02 |
| 2017/0320267 A1 | 11/2017 | Lind et al. | |
| 2019/0061243 A1* | 2/2019 | Saito | B33Y 30/00 |

\* cited by examiner

POLYMER EXHAUST FOR ELIMINATING EXTRUDER TRANSIENTS

CROSS REFERENCE TO RELATED APPLICATION

This application claims the benefit of U.S. Provisional Application, Ser. No. 62/543,062, filed on 9 Aug. 2017. The Provisional Application is hereby incorporated by reference herein in its entirety and is made a part hereof, including but not limited to those portions which specifically appear hereinafter.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

This invention relates to additive manufacturing, and more particularly to methods and apparatus to optimize big area additive manufacturing (BAAM).

BACKGROUND OF THE INVENTION

Big area additive manufacturing (BAAM) is a method of additively manufacturing large parts. A typical BAAM system uses a single screw extruder to deposit molten polymer, which builds parts layer by layer. At the beginning of extrusion, the extrusion rate is unsteady for a period of time due to the transient response of the system. A similar phenomenon occurs when the extruder is stopped and restarted. Therefore, there can either be too much or too little material deposited at the location where the extruder stopped and/or restarted. This leads to unevenness across the part surface and geometric irregularities at seams.

This issue has been partially addressed by adjusting extruder parameters at the start and stop of extrusion. This solution has limited effectiveness, however. Furthermore, behavior of start and stop transients is highly dependent on material type, length of time between extrusions, and other variables. This makes it difficult, if not impossible, to fully compensate for the dynamics of the system during starts and stops.

A previous invention, termed a "two-port nozzle," used a shutoff valve to cut off the flow at the end of the extrusion. This eliminated any residual melt or "drool" escaping from the end of the nozzle. However, this did not improve the start of an extrusion. In fact, it made it worse. When the valve is shut, there is residual pressure that remained inside the extruder. When the valve opened again at the start of the extrusion, this pressure causes a large glob of polymer to express from the nozzle.

SUMMARY OF THE INVENTION

A general object of the invention is to provide a method and apparatus for big area additive manufacturing (BAAM). In particular, a method and apparatus to improve print quality, improve resolution and reducing post processing for BAAM parts is desired.

The subject system, called the POSI-VERTER, solves or mitigates the problem of residual pressure inside the extruder's barrel. An exhaust port is preferably placed near the end of the barrel in a location where excess polymer can be extruded as waste without being deposited on the part. A diverter valve is positioned to switch polymer flow between the nozzle outlet and the exhaust port. When extrusion ends, the diverter valve shuts off flow to the nozzle, providing a clean shutoff, while residual pressure is exhausted out of the exhaust port.

As a result, the subject invention improves starts and stops on extrusion prints on BAAM, leading to improved part quality with minimal roughness at the seams. The ability to finely control starts and stops is also important to printing fine resolution on BAAM. High quality seams and fine resolution help with minimizing post processing. This can lead to parts being usable almost directly off the printer, with little or no post-processing.

Other objects and advantages will be apparent to those skilled in the art from the following detailed description taken in conjunction with the appended claims and drawings.

DETAILED DESCRIPTION OF THE INVENTION

The present invention provides methods for making an article with an additive manufacturing machine wherein working material is deposited on a deposit surface to form an article constructed from multiple or iterative layers or additions of such material.

Figure 1:
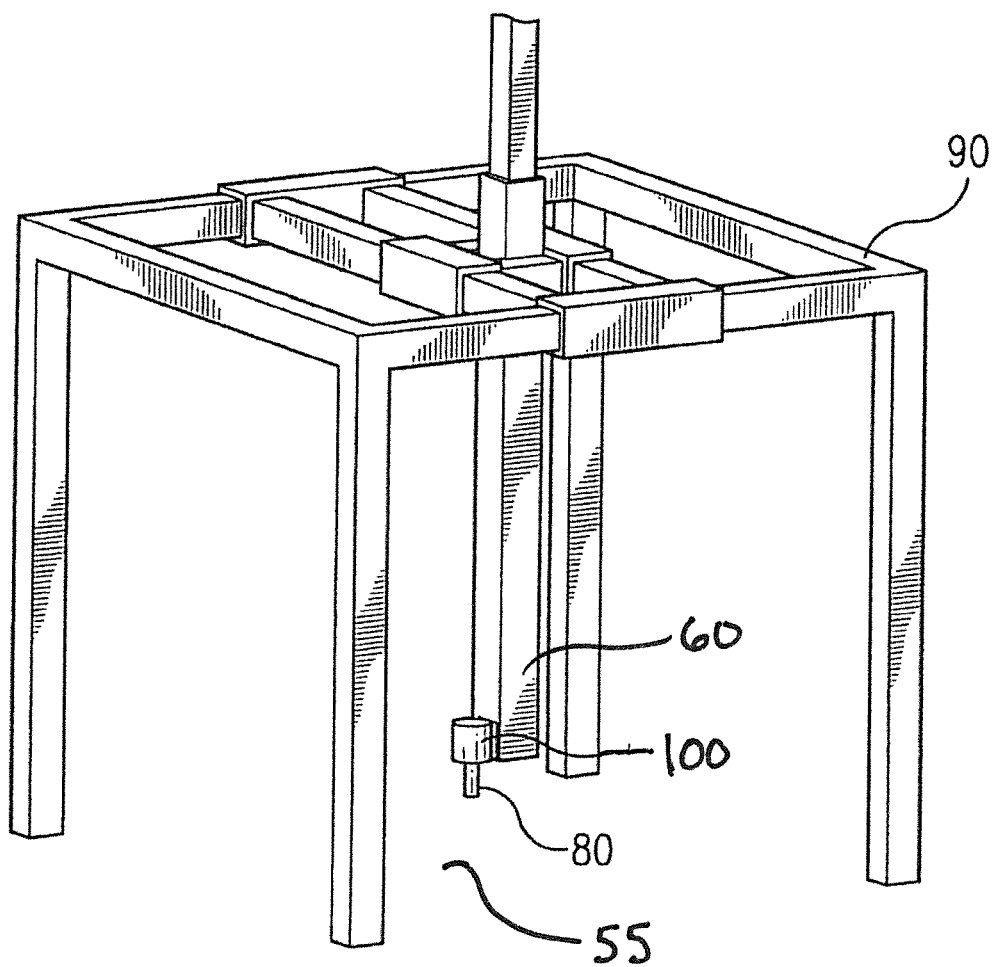
FIG. 1 is a schematic of a big area additive manufacturing system according to one embodiment of this invention.

Although not required, the subject invention is preferably used in connection with large scale polymer added manufacturing, also termed "big area additive manufacturing" or BAAM, such as the schematic shown in FIG. 1. FIG. 1 shows a frame or gantry 90 for containing a build on surface 55. The gantry 90 preferably contains a deposition arm 60 that is moveable through the x, y and z-axis, via a controller (not shown). The deposition arm 60 preferably accommodates a supply of working material and a deposition nozzle 80. The supply of working material may be onboard the deposition arm 60 and/or remotely supplied from a hopper or similar storage vessel.

Although generally referenced herein as "molten material" or "polymer," a suitable working material may include any meltable or otherwise workable material capable of extrusion and deposit through an associated nozzle in additive manufacturing systems. Other examples of working materials are a two-part thermoset having a mixture of base and hardener or a one-part photocuring resin.

Figure 2:
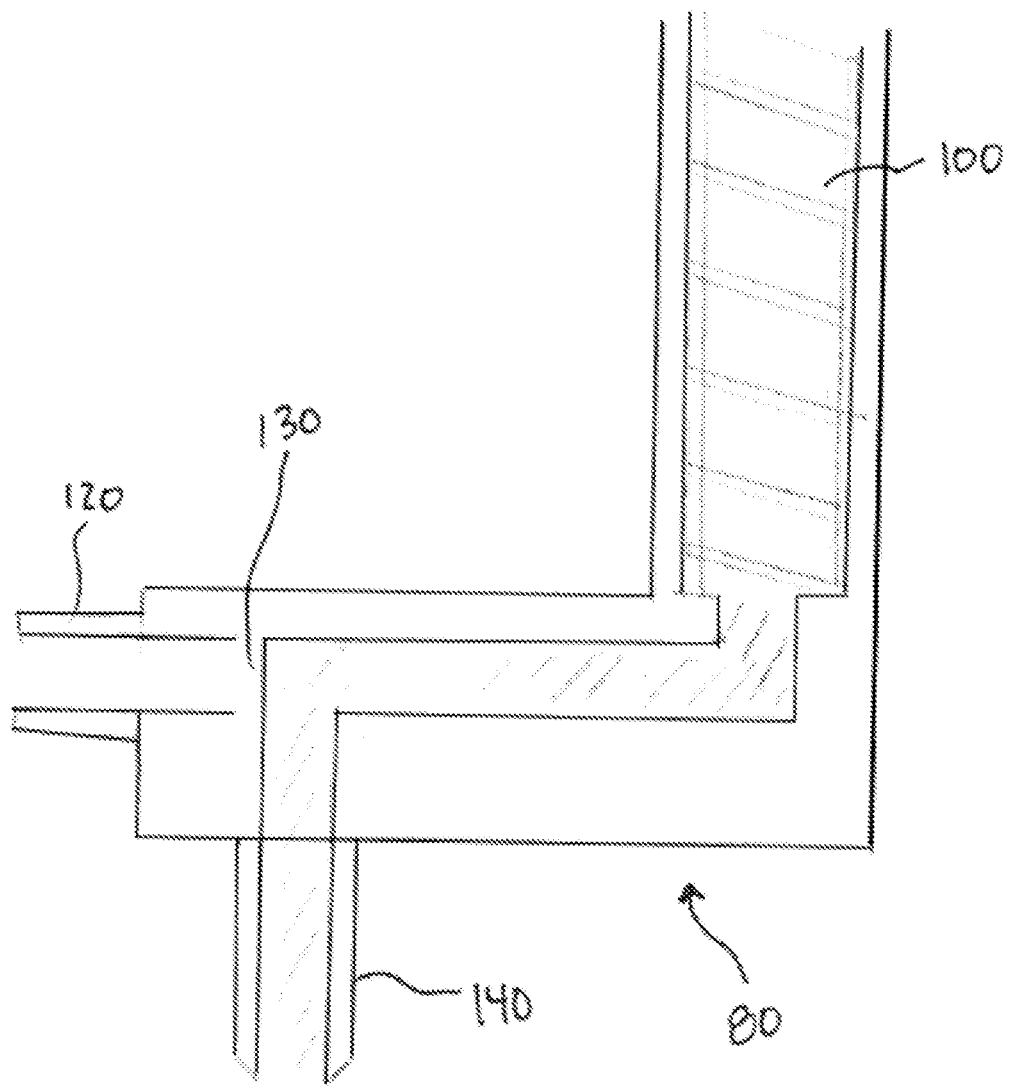
FIG. 2 is a schematic cross-sectional side view of a nozzle in a neutral position according to one embodiment of this invention.
Figure 3:
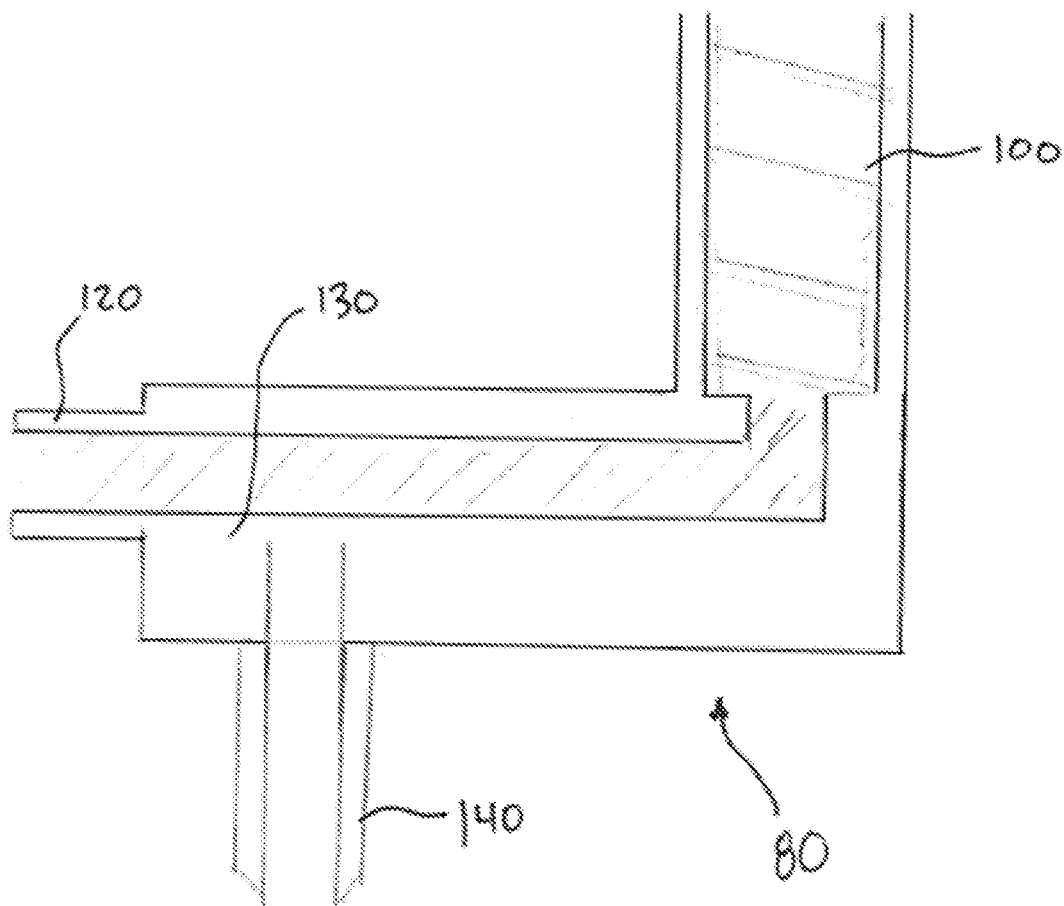
FIG. 3 shows a schematic cross-sectional side view of the nozzle of FIG. 2 in an open position.

The subject system, termed the POSI-VERTER, addresses the problem of residual pressure inside an extruder barrel. FIGS. 2 and 3 show a preferred embodiment of the subject system with a diverter valve in a closed or neutral position (FIG. 2) and an open position (FIG. 3).

As shown, an extruder 100 is positioned at one end of a nozzle 80, such as described above. An exhaust port 120 is preferably placed near the end of the extruder 100 in a location where excess working material (generally in molten form) can be extruded as waste or recycled without being deposited on the part. A diverter valve 130 is positioned to switch material flow between the nozzle outlet 140 and the exhaust port 120. When extrusion ends, the diverter valve 130 shuts off flow to the nozzle outlet 140, providing a clean shutoff, while residual pressure is exhausted out of the exhaust port 120.

The diverter valve 130 may be a ball valve, a gate valve, a barrel valve, a plug valve, a butterfly valve or other valve known in the art of fluid flow control. The diverter valve 130 may be actuated by an arm actuated pneumatically, hydraulically, or mechanically for example. The actuation of the diverter valve 130 open and closed positions is controlled via signals from a controller associated with the extruder 100.

An associated system for making an article with an additive manufacturing machine includes the extruder 100 providing a supply of molten material and the nozzle 80 connected with respect to the extruder 100, wherein the nozzle 80 directs the molten material out of a nozzle outlet 140 and on to a deposit surface 55, such as a deposition area or a part in process. A diverter valve 130 is positioned between the extruder 100 and the nozzle 80 to direct the molten material to an exhaust port 120 away from the deposit surface 55 under certain conditions.

As shown in FIGS. 2 and 3, the exhaust port 120 is positioned perpendicular to the nozzle outlet 140. In addition, the nozzle 80 preferably includes a non-linear flow path of molten material from the extruder 100 to the deposit surface 55. By non-linear flow path it is understood that the path of flow of the working material, typically in molten form, is not in-line from a center axis of the extruder 100 to the nozzle outlet 140. The non-linear flow path as shown includes two elbows between the extruder 100 and the deposit surface 55. The non-linear flow path as shown includes one elbow between the extruder 100 and the exhaust port 120.

As shown in FIGS. 2 and 3, the non-linear flow path directs the molten material to the deposit surface 55 in parallel to a flow of the extruder 100. Further as shown, the non-linear flow path may direct the molten material to the exhaust port 120 perpendicular to the flow of the extruder 100.

According to one embodiment, the exhaust port 120 redirects the "waste" molten material back to the extruder 100. In such a way, the working material may be recycled during use of the nozzle 80. Alternatively, the exhaust port 120 may redirect the molten material to waste or scrap.

In operation, a method for making an article an additive manufacturing machine includes providing a supply of molten material from the extruder 100 to the nozzle 80. The supply of molten material is then directed from the nozzle outlet 140 to the deposit surface 55. During operation, the molten material may be selectively diverted from the nozzle outlet 140 to an exhaust port 120 away from the deposit surface 55.

The diverter valve 130 as described may be opened and closed to selectively divert the molten material away from the deposit surface to an exhaust port 120. According to one embodiment the diverter valve 130 may be closed upon attainment of steady state conditions within the extruder 100. In this manner, once the extruder 100 is at temperature and/or otherwise producing an effective supply of molten material, access to the nozzle outlet 140 is enabled by the closure of the diverter valve 130, as shown in FIG. 2. In a contrary, or complementary scenario, the diverter valve 130 is opened during movement of the nozzle 80 away from the deposit surface 55. In this manner, when the nozzle 80 requires repositioning on the deposit surface 55 or within the gantry (see FIG. 1), the diverter valve 130 may be opened to relieve the flow of molten material from the nozzle outlet 140 to the exhaust port 120. A controller may be employed to automatically cycle the diverter valve in response to certain system conditions including position, temperature, or speed.

As described, the subject invention helps at start-up of the system, e.g., the beginning of extrusion. As the extruder 100 moves into place for extrusion it is turned on, the diverter valve 130 opens exhausting all the extrusion to waste. Once the extruder 100 reaches a steady state, the diverter valve 130 switches to allow material to flow to the nozzle outlet 140 for deposition. Thus, the extruder 100 is already at a steady state once deposition begins. It is also possible to leave the extruder 100 on in between depositions. The diverter valve 130 simply diverts the material to waste or otherwise away from the nozzle outlet 140 rather than allowing it to be deposited on the part.

The diverter valve 130 and exhaust port 120 in the subject system preferably bypass the start and stop transients of the extruder 100 allowing the extruder 100 to deposit material only while at steady state. This leads to significant improvements in the start and stop of extrusions and greatly improves part quality.

The subject system not only improves current part quality, but it enables the potential of finer resolution parts on the BAAM system. As nozzle diameters are reduced, the start and stop effects are amplified. Thus, to print at fine resolutions, it is imperative to have good control over starts and stops. The subject invention does this and will be a critical aspect for printing fine resolution parts. High quality seams and fine resolution are also critical for minimizing post-processing. As the need for post-processing is reduced, BAAM becomes more commercially attractive.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

We claim:

1. A system for making an article with an additive manufacturing machine comprising:

an extruder providing a supply of molten polymer working material;

a nozzle having a first end connected with respect to the extruder, the nozzle having a second end including a nozzle outlet directing the working material to a deposit surface, a nozzle flow path extending from the first end to the nozzle outlet, and an exhaust flow path extending from the nozzle flow path;

an exhaust port;

a diverter valve positioned between the extruder and the nozzle outlet, the diverter valve disposed at an intersection of the nozzle flow path and the exhaust flow path and configured to direct the working material into the exhaust flow path to the exhaust port and away from the nozzle outlet and the deposit surface; and a controller configured to actuate the diverter valve from a closed position to an open position.

2. The system of claim 1 wherein the exhaust port is positioned perpendicular to the nozzle outlet.

3. The system of claim 1 wherein the exhaust port is connected back to the extruder and redirects the working material to the extruder.

4. The system of claim 1 wherein the exhaust port redirects the working material to waste.

5. The system of claim 1 wherein the nozzle includes a non-linear flow path of working material from the extruder to the nozzle outlet.

6. The system of claim 5 wherein the non-linear flow path includes at least two angled elbows between the extruder and the deposit surface.

7. The system of claim 6 wherein the non-linear flow path includes at least one angled elbow between the extruder and the exhaust port.

8. The system of claim 1, wherein in the closed position the diverter valve directs the working material to the nozzle outlet and in the open position the diverter valve directs the working material to the exhaust port.

9. The system of claim 1, wherein the controller is configured to open the diverter valve to the exhaust flow path upon initialization of the extruder, and the controller is configured to close the diverter valve upon an extrusion of the working material deposition reaching a steady state within the nozzle flow path.

10. The system of claim 1, wherein after a first working material deposition the controller is configured to open the diverter valve toward the exhaust flow path to direct the working material to the exhaust port, the controller is configured to maintain the open diverter valve upon initialization of a second working material deposition, and the controller is configured to close the diverter valve upon an extrusion of the second working material deposition reaching a steady state from the extruder.

11. The system of claim 1, further comprising a gantry arm that is moveable in each of an x, y and z-axis above the depot surface, wherein the nozzle and the diverter valve are supported on the gantry arm.

12. A nozzle for use in additive manufacturing comprising:

an extruder providing a supply of molten polymer working material;

a non-linear nozzle flow path directing the working material from an end of the extruder to a nozzle outlet configured to direct the working material to a deposit surface;

an exhaust flow path extending from the nozzle flow path;

a diverter valve positioned between the extruder and the nozzle outlet and at an intersection of the nozzle flow path and the exhaust flow path, the diverter valve configured to direct the working material into the exhaust flow path to an exhaust port and away from the deposit surface; and a controller configured to actuate the diverter valve from a closed position to an open position to direct the working material into the exhaust flow path.

13. The nozzle of claim 12 wherein the non-linear flow path directs the working material to the nozzle outlet, and an outlet flow from the nozzle outlet to the deposit surface is parallel to a flow direction of the extruder.

14. The nozzle of claim 12 wherein the non-linear flow path directs the working material to the exhaust port in a direction perpendicular to a flow of the extruder.

15. The nozzle of claim 12 wherein the diverter valve closes upon attainment of steady state conditions within the extruder.

16. A method for making an article with the system of claim 1, the method comprising:

providing the supply of molten polymer working material from the extruder to the nozzle;

directing the supply of molten polymer working material from the nozzle to the deposit surface; and selectively diverting the molten polymer working material from the nozzle to the exhaust flow path and away from the deposit surface.

17. The method of claim 16 further comprising:

opening and closing the diverter valve to selectively divert the working material away from the deposit surface to the exhaust port.

18. The method of claim 17 further comprising:

closing the diverter valve for the directing the supply of molten polymer working material from the nozzle to the deposit surface upon attainment of steady state conditions within the extruder.

19. The method of claim 17 further comprising:

opening the diverter valve for selectively diverting the molten polymer working material from the nozzle to the exhaust flow path during movement of the nozzle away from the deposit surface.

20. The method of claim 16 further comprising:

automatically cycling the diverter valve between an open position and a closed position in response to certain system conditions including position, temperature, or speed.

* * * * *